Patented Apr. 13, 1926.

1,580,136

UNITED STATES PATENT OFFICE.

ROBERT HAMBURGER AND STEFAN KAESZ, OF FREUDENTHAL, CZECHOSLOVAKIA.

PROCESS FOR BLEACHING ORGANIC MATERIALS.

No Drawing. Application filed November 16, 1923. Serial No. 675,070.

*To all whom it may concern:*

Be it known that we, ROBERT HAMBURGER, a citizen of the Republic of Czechoslovakia, and STEFAN KAESZ, a citizen of the Republic of Austria, both residents of Freudenthal, Czechoslovakia, have invented certain new and useful Improvements in a Process for Bleaching Organic Materials, of which the following is a specification.

This invention relates to the bleaching of solutions, extracts and solid organic materials.

It is well known, that chlorine peroxide shows a peculiar behaviour towards many substances. In contra-distinction to chlorine, which is water undergoes some sort of hydrolysis, and to sulphur dioxide, its structural analog, whose anhydride is transformed by water into the corresponding acid, chlorine peroxide remains under normal conditions indifferent to water. Although being a compound relatively rich in oxygen it is incapable of exercising an action on a solution of hydrochloric acid of a certain concentration, or on sulphuric acid or on many organic acids. These remarkable inactive properties are also manifested by the behaviour of chlorine peroxide towards a number of organic substances and compounds, as for instance glycerine, carbohydrates, cellulose etc. Furthermore it does not act upon a number of amino-acids constituting parts of albuminous bodies (the principal and most substantial components of substances of animal origin).

Now we have discovered the surprising fact, that chlorine peroxide is capable of most efficiently removing the coloring character of certain bodies forming undesirable admixtures of organic substances. We have particularly stated, that the coloring agent of molasses, sugar-juices, worts from grains, the commercial lactic acid, caramels, commercial glycerine, of solutions of glue and the like are destroyed by chlorine peroxide. It it evidently the unsaturated nature of the said coloring matters and moreover of many other sorts of dyeing agents, upon which this capacity of easily reacting with chlorine peroxide depends and which is the cause of the destruction of their coloring character.

The present invention utilizes this selective action of chlorine peroxide for the purpose of bleaching solutions and extracts containing undersirable coloring admixtures. Furthermore according to the invention, also solid organic bodies, as for instance textile materials, papers and the like, may be bleached by chlorine peroxide in a moist state. A special advantage of chlorine peroxide over other bleaching means, e. g. chlorine, consists in the fact, that chlorine attacks the materials to be bleached, whilst chlorine peroxide only acts upon the said dyeing agents by destroying their coloring nature without attacking the material to be bleached itself.

The preparation of the chlorine peroxide may be effected by any one of the known methods, for instance by the action of sulphuric acid upon potassium chlorate, or by treating potassium chlorate with oxalic acid. The latter method offers the advantage, that the chlorine peroxide is evolved in a very pure state being mixed only with carbon dioxide, whereby the danger of explosive decomposition is prevented. The explosive nature of chlorine peroxide is one of the principal reasons of its being not used up to the present in industry on a commercial scale. As a result of very exhaustive experiments we are able to state, that the characteristic bleaching action which gaseous chlorine peroxide exerts upon liquids as well as that of aqueous chlorine peroxide on solids and liquids may be utilized without any danger of quick decomposition with explosion by preparing this substance in a gaseous, dilute and perfectly pure state.

It is immaterial whether the substances to be bleached are treated with gaseous chlorine peroxide, or with an aqueous solution obtained by the gas being passed into water efficiently cooled. In the first case the excess of chlorine peroxide is expelled by blowing with air, carbon dioxide or another indifferent gas, in the latter case an excess is removed from the solid materials by washing them out with pure water.

When reacting with chlorine peroxide on solutions or extracts, the operation is of course to be carried out in an acid or neutral solution. The materials to be treated are exposed to the action of the gas or of the aqueous solution of chlorine peroxide for a sufficiently long time till the desired degree of bleaching is arrived at.

For the purpose of perfectly decolorizing some materials, the latter may subsequently be subjected to a treatment with any one of the known bleaching means, as for instance with chlorine, sulphur dioxide or acid salts of sulphurous acid, with hyposulphurous acid or its salts, with hydrogen peroxide or the like.

The following are examples of carrying the invention into practice:

1. Molasses of about 80 degrees Brix is diluted by addition of water to a degree of 40°, 15° or 8° Brix and gaseous chlorine peroxide is then introduced. The vessel containing the solution of molasses is to be cooled in an efficient manner. The brown-red color of the molasses will disappear and change into slightly yellow. When the desired decoloration of the molasses is attained, air or carbonic acid or any other gas indifferent to chlorine peroxide, is driven through. The same result may be obtained by using an aqueous solution of chlorine peroxide instead of its gaseous form.

2. A highly concentrated solution (30 degrees Brix) of raw (brown) sugar is treated in the same manner as is indicated in Example 1, till the solution is decolorized.

3. Commercial lactic acid is to be treated in the manner of Example 1.

4. A solution of glue (bone-glue) can also be subjected to the action of chlorine peroxide in the same manner.

5. Fabrics (linen or cotton stuffs and tissues) are drenched (thoroughly moistened) with water and thereafter exposed to a concentrated solution of chlorine peroxide, for instance by immersion into such a solution, or by sprinkling them with the atomized solution or by letting the solution drip thereon. When the decoloration is attained, the material is drawn through another bath of pure water for the purpose of removing the last traces of chlorine peroxide.

We wish it to be understood that we do not desire to be limited to the exact details and proportions as indicated, for obvious modifications will occur to a person skilled in the art.

We claim:

1. A process for bleaching organic materials which consists of destroying their coloring constituents without deteriorating the organic materials themselves by treating said organic materials with chlorine peroxide.

2. The process for bleaching organic materials which consists of treating them with chlorine peroxide in the presence of water.

3. The process for bleaching organic materials which consists of exposing them to the action of an aqueous solution obtained by the chlorine peroxide being passed into water.

4. The process of bleaching solid organic materials which consists in exposing them in a moist state to the action of an aqueous solution of chlorine peroxide.

5. The process of bleaching organic materials which consists of treating them with chlorine peroxide, removing the excess of this gas, and thereafter completing the bleaching action by treatment with another bleaching agent as usually employed.

In testimony whereof we have affixed our signatures.

ROBERT HAMBURGER.
STEFAN KAESZ.